W. Weaver,

Ash Sifter.

No. 111,795. Patented Feb. 14, 1871.

Witnesses:
A. Bennerkendorf.
L. S. Mabee

Inventor:
W. Weaver
per Munn & Co
Attorneys.

United States Patent Office.

WILLIAM WEAVER, OF GREENWICH, NEW YORK.

Letters Patent No. 111,795, dated February 14, 1871

IMPROVEMENT IN ASH-SIFTERS.

The Schedule referred to in these Letters Patent and making part of the same.

*To all whom it may concern:*

Be it known that I, WILLIAM WEAVER, of Greenwich, in the county of Washington and State of New York, have invented a new and useful Improvement in Ash-Sifter; and I do hereby declare that the following is a full, clear, and exact description thereof, which will enable others skilled in the art to make and use the same, reference being had to the accompanying drawing forming part of this specification, in which—

Similar letters of reference indicate corresponding parts.

My invention has for its object to furnish an improved sifter for sifting ashes, coals, and other substances, which shall be so constructed as to prevent the escape of dust or ashes, thus adapting it for use in a room, yard, or other place where the dust would be a nuisance, and which shall at the same time be simple in construction and conveniently operated; and It consists in the construction and combination of the various parts of the sifter, as hereinafter more fully described.

A is the box of the sifter, which I prefer to make in the form of a small house.

The box A is made of matched boards, to make close joints, said joints being covered with battens or strips of wood, to still further guard against the escape of dust or ashes.

B is the hopper, through which the ashes or other material to be sifted is introduced, and which is placed in the top of the box A near one end, in a position corresponding with that of a chimney in an ordinary house.

The upper part of the hopper B is provided with a sliding door or cover, C, to prevent the escape of dust while the material is being sifted.

D is the sieve, which rests and slides upon bars or ways, E, in the upper part of the box A, and is provided with a long handle, F, which extends out through a hole in the end of the box opposite to that at which the hopper B is placed, so that the sieve can be moved back and forth at any desired velocity to sift the material.

One of the bars E extends the entire length of the box A, and the other extends only to the partition that separates the ash-chamber G from the chute or cinder-chamber H.

By this construction, when the sieve D is agitated, the ashes pass through the sieve and drop into the chamber G.

Figure 1:
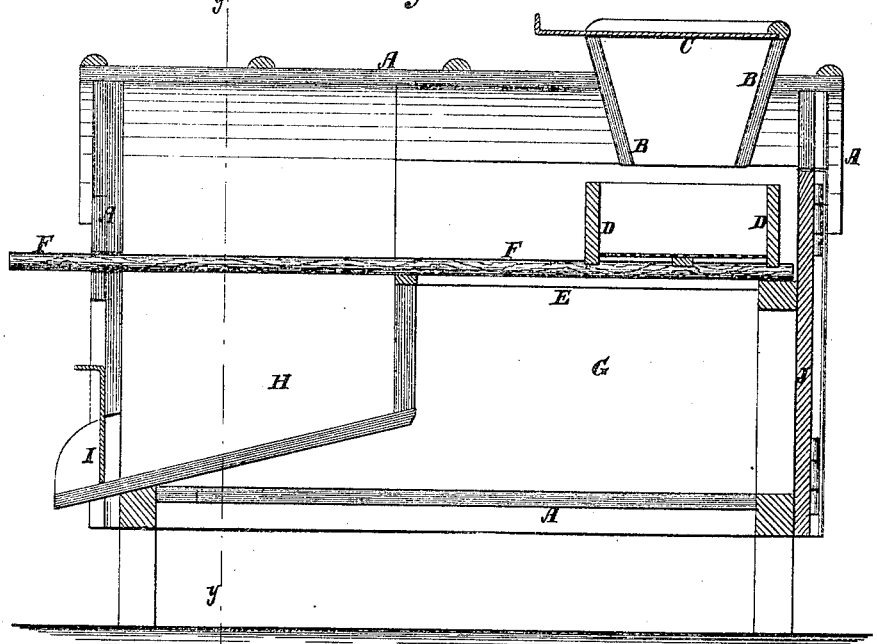
Figure 1 is a vertical longitudinal section of my improved ash-sifter, taken through the line $x\,x$, fig. 2.
Figure 2:
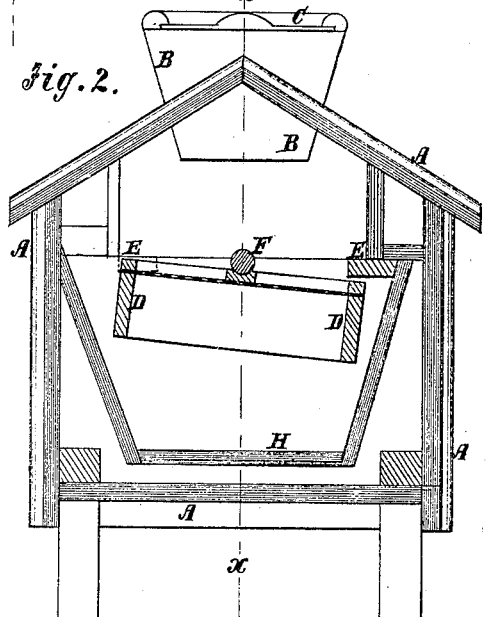
Figure 2 is a vertical cross-section of the same, taken through the line $y\,y$, fig. 1.

When the sifting has been completed the sieve is drawn to the other end of the box, and as it passes beyond the end of the short bar E it turns over by its own weight and discharges the cinders into the cinder-chamber or chute H, the bottom of which is made inclined, as shown in fig. 1, so that the cinders may be run into a coal-hod or other receptacle by opening a sliding door or gate, I, in the end of the box A.

When desired, or when the ash-chamber G has become filled, the ashes may be removed through a door, J, in the end or side of the box A.

The sifter may be made of any desired size, according to the amount of sifting to be done, and may be placed in a house, shed, yard, or other convenient place, the ashes being left in the chamber G until it may be convenient to remove them.

Having thus described my invention,

I claim as new and desire to secure by Letters Patent—

An improved sifter, consisting of the box A, hopper B provided with a door or cover, C, sieve D, long handle F, bars or ways E, ash-chamber G, chute or cinder-chamber H, sliding door or gate I, and door J, said parts being constructed and arranged substantially as herein shown and described, and for the purpose set forth.

The above specification of my invention signed by me this 1st day of December, 1870.

WILLIAM WEAVER.

Witnesses:
HENRY ACKLEY,
JAMES T. GRAHAM.